United States Patent

Uitvlugt

[11] Patent Number: 5,964,921
[45] Date of Patent: Oct. 12, 1999

[54] METHOD AND DEVICE FOR REMOVING HARMFUL SUBSTANCES, IN PARTICULAR, DIOXIN

[75] Inventor: Martin Gerardus Uitvlugt, Duiven, Netherlands

[73] Assignee: N.V. Avira Afvalverwerking, AC Cuiven, Netherlands

[21] Appl. No.: 09/189,445

[22] Filed: Nov. 10, 1998

Related U.S. Application Data

[63] Continuation of application No. PCT/NL97/00061, Feb. 13, 1997.

[30] Foreign Application Priority Data

May 17, 1996 [NL] Netherlands ............................ 1003151

[51] Int. Cl.[6] .................................................. B01D 47/06
[52] U.S. Cl. ..................................... 95/13; 95/94; 95/147; 95/237; 96/111; 96/244; 96/275
[58] Field of Search ..................................... 95/12, 13, 92, 95/94, 143, 210, 211, 237, 147; 96/111, 244, 290, 322, 327, 272, 273, 275, 323; 261/DIG. 9, DIG. 54

[56] References Cited

U.S. PATENT DOCUMENTS

| | | | |
|---|---|---|---|
| 2,782,866 | 2/1957 | Etherington et al. | 95/13 |
| 3,112,352 | 11/1963 | Krantz | 96/327 X |
| 3,330,231 | 7/1967 | Spencer | 96/322 X |
| 3,668,825 | 6/1972 | McIlvaine | 95/13 X |
| 3,812,657 | 5/1974 | Lampinen | 96/273 |
| 3,841,061 | 10/1974 | Pike | 96/272 |
| 3,927,986 | 12/1975 | Ishikawa et al. | 261/DIG. 9 |
| 4,401,051 | 8/1983 | Gunther | 96/327 X |
| 4,849,057 | 7/1989 | Steinstrasser et al. | 96/322 X |
| 4,957,715 | 9/1990 | Grover et al. | 95/92 X |
| 5,643,797 | 7/1997 | Schmidt et al. | 96/244 X |
| 5,759,233 | 6/1998 | Schwab | 95/13 X |

FOREIGN PATENT DOCUMENTS

| | | | |
|---|---|---|---|
| 0509258 | 10/1992 | European Pat. Off. | |
| 0628341 | 12/1994 | European Pat. Off. | |
| 3941894 | 6/1991 | Germany. | |
| 4233303 | 1/1994 | Germany. | |
| 60-106518 | 6/1985 | Japan | 95/13 |
| 1364357 | 1/1988 | U.S.S.R. | 95/13 |
| WO9319141 | 9/1993 | WIPO. | |

OTHER PUBLICATIONS

Wasser, Luft und Boden, vol. 33, No. 6, Jun. 1, 1989, p. 39/40, 42 XP000068476 Lemann M: "Mehrstufige Rauchgasreinigung fur Mullverbrennungsanlagen".

*Primary Examiner*—Richard L. Chiesa
*Attorney, Agent, or Firm*—Jones, Day, Reavis & Pogue

[57] ABSTRACT

A method for removing harmful substances, in particular dioxin, from flue gas generated in for example a waste incinerator, using an adsorption agent, characterized in that after said flue gas has been washed with a washing medium, the adsorption agent is discharged together with the washing medium for subsequent collection of the adsorption agent. At least one of the substances from the group of active carbon, brown coal, coke, lime, lava rock and pumice stone is used as the adsorption agent.

19 Claims, 5 Drawing Sheets

METHOD AND DEVICE FOR REMOVING HARMFUL SUBSTANCES, IN PARTICULAR, DIOXIN

This is a continuation of copending International Serial No. PCT/NL97/00061, filed on Feb. 13, 1997 and designating the United States of America.

BACKGROUND OF THE INVENTION

1. Field of the Invention

The invention relates to a method for removing harmful substances, in particular dioxin, from flue gas generated in for example a waste incinerator, using an adsorption agent.

2. Description of the Prior Art

In the waste processing plants that have been used so far domestic waste is processed by means of incineration. The term domestic waste is not only understood to mean waste from private individuals, but also waste from companies which is similar to the waste produced by private individuals as regards its composition, this in contrast to industrial waste.

When domestic waste is incinerated energy is released in the form of heat. The energy that is released is used either for generating electricity or for district heating. The oxygen required for the incineration of domestic waste is supplied with ambient air. The principal residual products of the incineration process are slag, fly ash, flue gas scrubbing residue and flue gas.

In order to prevent the harmful substances that are released during the incineration process from finding their way into the environment via the flue gas, the waste processing plants are provided with a flue gas scrubbing plant. Said harmful substances include: hydrocarbons (CxHy), cadmium (Cd), carbon monoxide (CO), chloric acid (HCl), hydrogen fluoride (HF), mercury (Hg) (plus other heavy metals), dioxin, sulphur dioxide ($SO_2$), nitrogen oxides ($NO_x$) and fly ash.

Generally the term dioxin is understood to mean polychlorodibenzoparadioxin (PCDD) and polychlorodibenzofuran (PCDF). These two substances have the following structural formula:

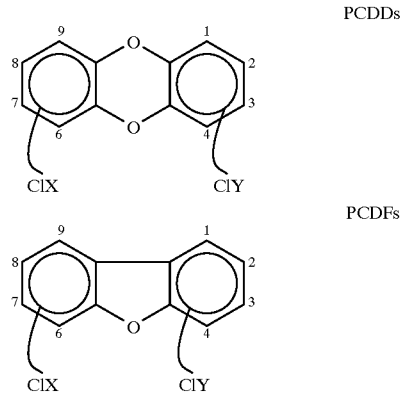

A method for removing dioxin from flue gas from a waste processing plant is known from European patent No. 0 574 705 in the name of Sumitomo Heavy Industries Ltd. With this known method the removing of dioxin takes place by carrying the flue gas through a so-called "moving bed absorber of the cross-flow type" at a temperature of 90–120° C. Active carbon or active coke is thereby supplied to the above absorber, which carbon or coke is to make contact with the flue gas that is likewise supplied thereto. Then said active carbon and the dioxin adsorbed therein is regenerated by being heated and subsequently returned to said absorber.

One drawback of the known method is that it is unattractive from an economic point of view because an additional adsorption device (inclusive of regeneration agents) has to be used besides the actual waste processing plant. In addition to that the active carbon must be processed separately after having been regenerated a number of times. Because of this the known method is not only costly, but also complex. In practice it has become apparent, therefore, that although dioxin is removed from the flue gas by using the method according to the aforesaid European patent is applied, this takes place in a costly and inefficient manner.

The object of the invention is to provide an economical and efficient method for removing harmful substances, in particular dioxin, from flue gas, and in order to accomplish that objective a method of the kind referred to in the introduction is characterized in that after the flue gas has been washed with a washing medium, the adsorption agent is discharged together with said washing medium for subsequent collection of the adsorption agent, whereby the magnitude of at least one parameter which (partially) governs the dioxin content of the flue gas/washing medium is adapted to the (degree of) adsorption or desorption, as the case may be, of dioxin by the apparatus used for carrying out the method. More in particular said parameter is selected from the group of amount of adsorption agent, amount of waste incinerated per time unit, furnace temperature and amount of air supplied for the incineration of waste. As a result of this the method according to the invention is extremely simple and elegant, because no separate adsorber is required. The invention is in particular based on the perception that a controlled low dioxin emission is only achieved when the effect of adsorption or desorption of dioxin by (the lining of) the apparatus being used (which has not been recognized so far) is taken into account. By increasing or decreasing the amount of adsorption agent in the case of adsorption or desorption respectively a condition of equilibrium is created between the adsorption of dioxin and the release thereof by the (lining) of the apparatus, and that in a controlled manner. Preferably the adsorption agent is injected, more in particular in the form of a powder, before the flue gas is washed. This makes it possible for the adsorption agent to come into intimate contact with the flue gas in a very efficient manner in a relatively short period of time, as a result of which a practically complete adsorption of the dioxin will take place. Said intimate contact is effected by the turbulence of the flue gas. Extensive testing has surprisingly shown that in this manner the bulk of the dioxin is removed from the flue gas. It is noted in this connection that according to the invention a limit value for the emission of dioxin of less than 0.4 g $TEQ/m^3$, in particular less than 0.1 ng $TEQ/m^3$, is achieved.

One preferred embodiment of a method according to the invention is characterized in that the dioxin content of the flue gas is measured before and after the removal of dioxin therefrom (in particular before and after the washing of the flue gas), as well as the dioxin content of the washing medium being discharged, on the basis of which measurements the dioxin content of the washing medium resulting from the adsorption or desorption by the apparatus used in carrying out the method is calculated, whereby the magnitude of the parameter is controlled in dependence on the (degree of) said adsorption or desorption.

Another preferred embodiment of a method according to the invention is characterized in that said adsorption agent is injected after a first cooling down of the flue gas to a temperature below 400° C., preferably below 300° C., in particular a temperature of 250° C. or below. Extensive testing has shown that the formation of dioxin predominantly takes place in the above temperature ranges.

The most efficient method is, therefore, to remove the dioxin from the flue gas immediately after the formation thereof by adsorbing it to the adsorption agent.

Another preferred embodiment of a method according to the invention is characterized in that the adsorption agent is injected while the flue gas is being washed. Due to the intimate contact of the liquid with the dioxin during the washing of the flue gas a considerable amount of dioxin is adsorbed.

Another preferred embodiment of a method according to the invention is characterized in that the adsorption agent is injected during a first washing stage in an at least substantially acidic environment. An important advantage of this is that other harmful substances, such as heavy metals, are adsorbed, and thus removed from the flue gas (which is wet as a result of being washed, and isolated in the washing medium (washing water)).

Another preferred embodiment according to the invention is characterized in that the adsorption agent is injected during a second washing stage (while adding a neutralisation agent, preferably caustic soda) in an environment which is at least substantially less acidic than that of the first washing stage. It is preferred to inject the adsorption agent also in a third washing stage, whereby use is made of a venturi. In particular any heavy metals and dioxin that remain (often in the rubber lining of the washers used in the various washing stages) will thereby adhere to the adsorption agent.

Another preferred embodiment of a method according to the invention is characterized in that at least one of the substances from the group of active carbon, brown coal, coke, lime, lava rock and pumice stone is used as the adsorption agent.

The invention also relates to a device for carrying out the method.

BRIEF DESCRIPTION OF THE DRAWINGS

The invention will be explained in more detail below with reference to FIG. illustrated in a drawing, in which.

DETAILED DESCRIPTION OF THE PREFERRED EMBODIMENTS

Figure 1:
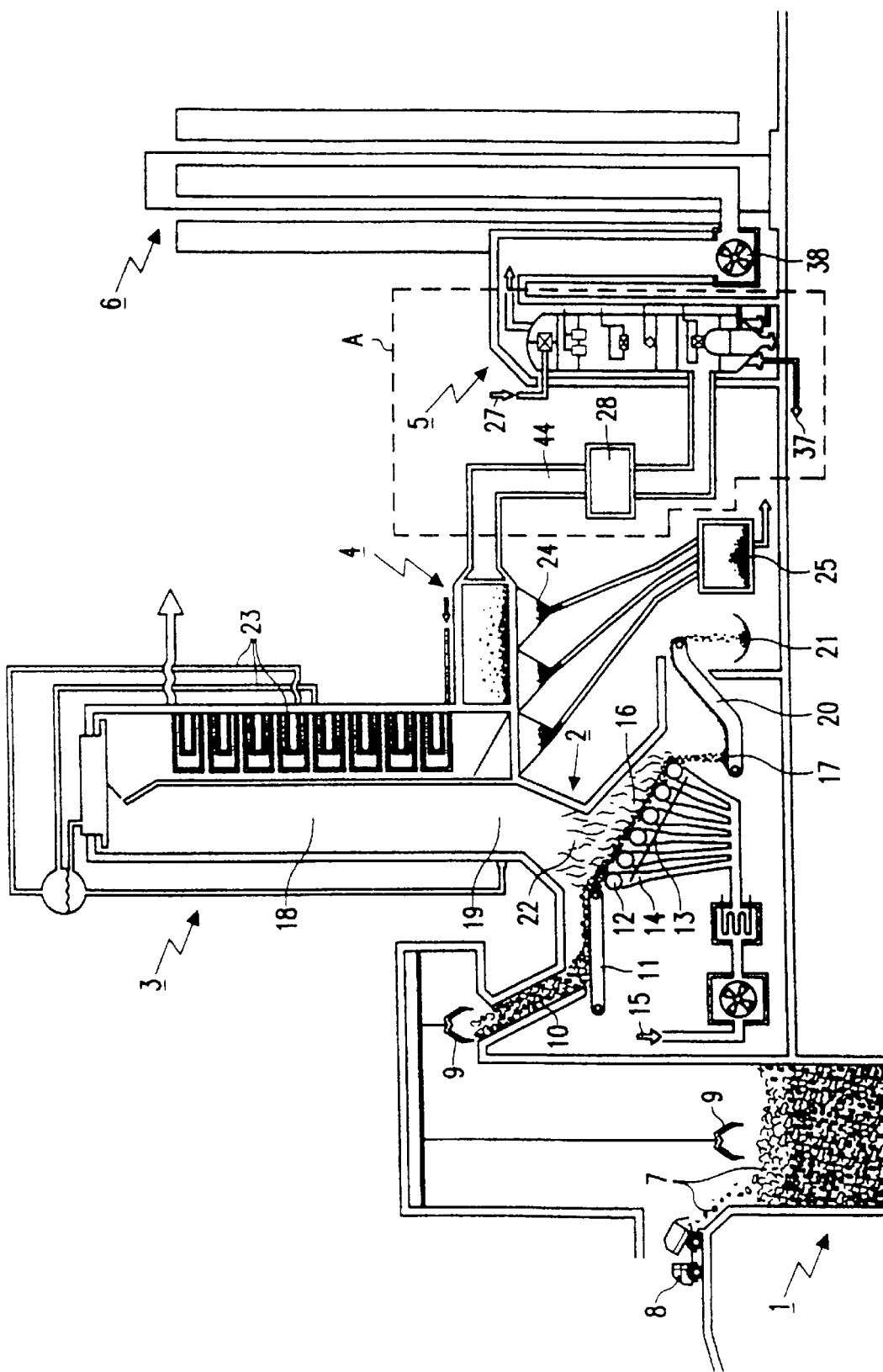
FIG. 1 diagrammatically shows a preferred embodiment of a waste incinerator according to the invention.

FIG. 1 shows a hopper 1, an incinerator 2, a steam boiler 3, an electrofilter 4, a flue gas washer 5 and a chimney 6.

Domestic waste 7 is dumped into hopper 1 by refuse collectors 8. The domestic waste has already been crushed during the transport in the refuse collector, as a result of which a certain degree of mixing has already taken place. Bulky waste, such as discarded furniture, is cut into pieces in a waste reducer (not shown) and subsequently dumped into the hopper. Inside hopper 1 further mixing of the domestic waste 7 takes place by means of grabs 9. Said mixing serves to homogenize the waste present in the hopper as regards humidity degree, bulk and combustibility. Said grabs 9 subsequently deposit the mixed domestic waste on a conveyor 11 via a feed funnel 10, which conveyor transports the waste to the incinerator 2.

Present within incinerator 2 are six rolls 12, which form a rotary grate 13. Rotary grate 13 constitutes a downwardly sloping surface. Rolls 12 have a diameter of 1.50 m and a width of 3.60 m. The rotational speed can be adjusted between 0.5 and 11 revolutions per minute. Rolls 12 define supply openings 14 for supplying heated ambient air 15 to the furnace. Ambient air is also introduced via other openings round the furnace.

Rolls 12 transport the domestic waste 7 slowly through the furnace, thus enabling a uniform incineration. The transport towards the centre 16 of the furnace serves to heat and dry the domestic waste, whilst the transport away from the centre 16 of the furnace serves to carry off the incineration residue 17. The temperature in the centre 16 of the incinerator is approximately 1000° C.

The incineration process can be controlled by varying the speed of the rolls 12. This makes it possible to control not only the amount of domestic waste that is supplied per time unit, but also the humidity degree of the domestic waste upon incineration, the furnace temperature and the degree of incineration of the residue. Another means of controlling the incineration process is to vary the amount of ambient air 15 which is blown through the supply openings 14 between rolls 12. The incineration process takes about 1.5 hours. The capacity of the waste processing plant is about 15,000 kg per hour.

The nitrogen oxides ($No_x$) present in the flue gas 18 are largely converted into nitrogen ($N_2$) and water ($H_2O$) at a temperature of 850–1000° C. as a result of the injection of ammonia ($NH_3$) into the first part 19 of steam boiler 3. This technique is known as Selective Non-Catalytic Reduction (SNCR). The incineration ash 17 is discharged by means of a conveyor 20. The scrap present in the incineration ash 17 is recovered by means of magnetic belts (not shown). The remaining slag 21 is discharged by means of a conveyor. Said slag is inter alia used as a foundation material in road construction. The flue gas 18 which is formed during the incineration process is carried from furnace 22 to steam boiler 3.

The fly ash particles carried along with the flue gas 18 can fully combust in steam boiler 3. Present within steam boiler 3 are tube banks of a heat exchanger 23, in which water is converted into steam. The steam being generated is used either for driving a turbine having a capacity of 15 Megawatt or for heating a heat exchanger connected to the district heating system. The flow of the flue gas in the steam boiler is highly turbulent. In the steam boiler the flue gas cools down from a temperature of about 1000° C. to a temperature of 210–250° C.

Following its passage through the steam boiler 3 the flue gas 18 is passed through a single-field electrofilter 4. Said electrofilter 4 comprises a system of wires (not shown) exhibiting a potential difference in relation to the fly ash particles present in the flue gas. As a result of this potential difference maximally 97% of the fly ash particles is extracted from the flue gas. The fly ash 24 is collected in a hopper 25 and subsequently discharged for being used in road construction. It is advisable to operate the electrofilter 4 at the lowest possible flue gas temperatures, since no formation of dioxin takes place in the cooling range of the flue gases below 250° C. The fact of the matter is that the fly ash present in the electrofilter enhances the formation of dioxin, with more dioxin being formed when temperatures are higher. After the flue gas has passed the electrofilter, it is carried to the flue gas washer 4, which is illustrated as detail A in FIG. 2.

Figure 2:
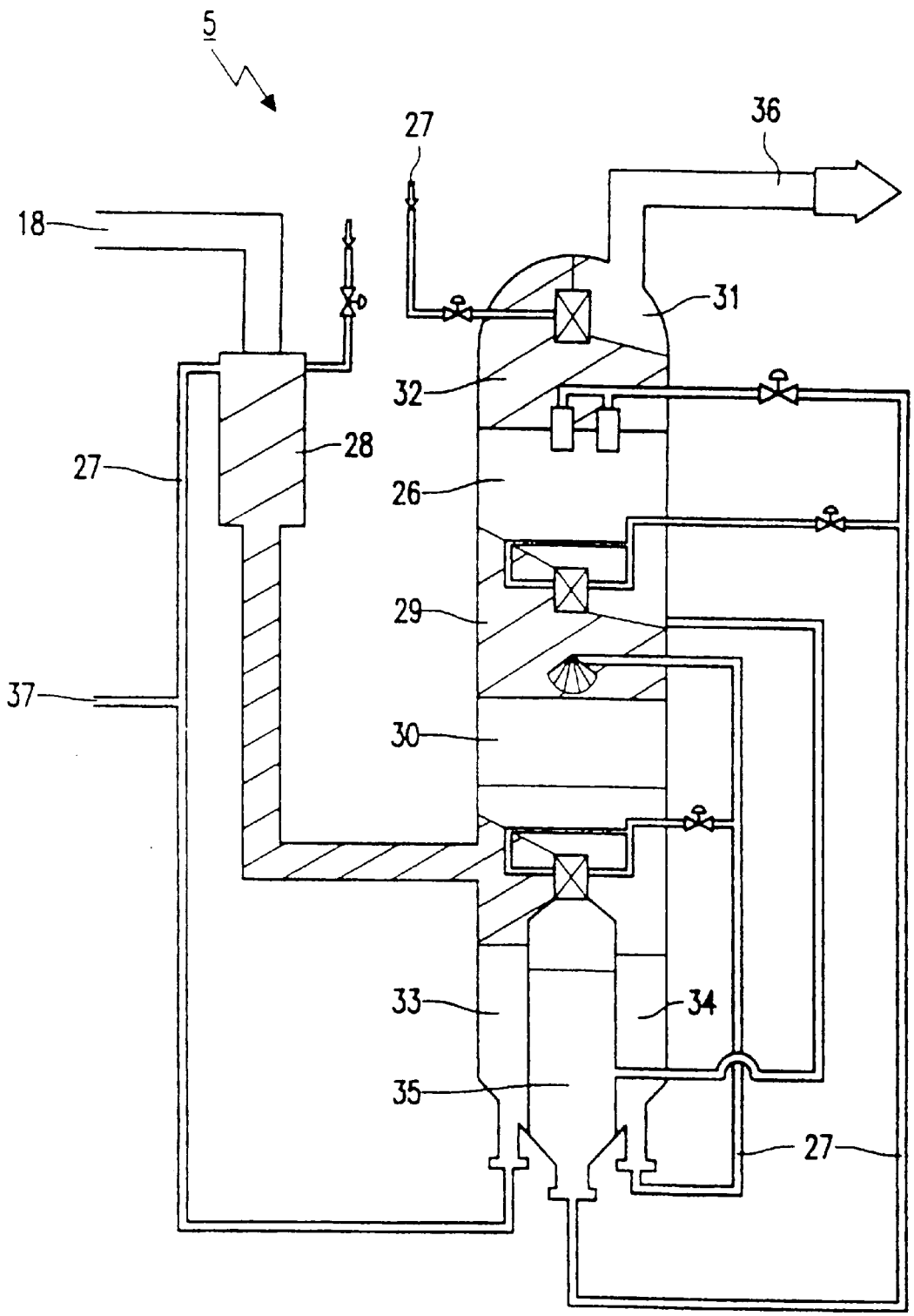
FIG. 2 shows a detail of FIG. 1.

Referring to FIG. 2, the flue gas washer S comprises a washing plant in one washing tower 26, in which the flue gas 18 is washed in three washing stages by means of a washing liquid 27. The washing liquid mainly consists of water. The washing tower comprises a steel vessel, which is lined with rubber on the inside.

In the first washing stage 28 the intimate contact with the washing liquid causes the flue gas to cool down to a temperature of approximately 70° C. This first washing stage is called the quenching stage. During this stage part of the washing liquid is evaporated and the acidic gases HCl and HF are dissolved in the water of the washing liquid. Also metals and the fly ash that remains in the flue gas are dissolved in the water. Also the $NH_3$ that is present in the flue gas as a result of the injection of ammonia is dissolved in the washing liquid. The washing liquid is acidic (pH<1) as a result of the acidic gases being dissolved. The acidic environment is conducive to the separation of mercury (Hg) from the flue gas. The flue gas is subsequently carried to the second washing stage 29.

In the second washing stage 29 a slightly acidic to neutral environment (pH 5–7) is maintained by adding caustic soda (NaOH) to the washing water. The washing plant is filled with a layer of porcupine-shaped contact members 30, which provide an intimate contact between the caustic soda and the flue gas. As a result of said intimate contact the sulphur dioxide ($SO_2$) present in the flue gas is dissolved in the washing liquid. The second washing stage is called the "packed column washing stage".

A In the third washing stage 31 the flue gas is passed through a ring jet 32, which comprises a plate in which a number of venturi-like channels are provided in side-by-side relationship to form a venturi, in which washing liquid is atomized. As a result of the alternating compression and expansion upon passing the venturi residual HCl, HF, $SO_2$ dust and salts condense from the flue gas in the form of aerosols and are subsequently carried along by washing water 27 being additionally supplied and atomized. The substances that have deposited are washed away by means of the washing liquid. The third washing stage is called the "ring jet washing stage".

Droplet separators (not shown) are disposed between the washing stages for extracting from the flue gas small fly ash particles and aerosols which are dissolved in the washing water. The washing liquid is caught separately for the first, the second and the third washing stages at the bottom of the washer (at the places indicated by numerals 33, 34, and 35 respectively). After having passed the third washing stage 31 the scrubbed flue gas 36 exits the flue gas washer 5.

After having been reticulated a number of times within the same washing stage, the washing liquid is carried to a joint physical-chemical waste water purification plant via discharge pipe 37. The waste water purification plant is not shown. In said waste water purification plant the acidic washing liquid environment is made neutral/slightly alkaline after the ammonia has been recovered by means of steam strippers. A precipitate of metal hydroxides is formed in said alkaline environment by the addition of precipitation-forming substances ($Na_2S$). Said precipitate is separated by flocculation. After dewatering in a filter press a filter cake remains, which consists of 40% dry matter. Said filter cake is discharged to an ICC (Isolate, Control and Check) dumping site. After having passed a sand filter the purified washing water is carried to a sewage water purification plant.

Referring again to FIG. 1, in the illustrated embodiment of the waste processing plant according to the invention the flue gas washer 4 constitutes the last step in the flue gas scrubbing process.

After having passed the flue gas washer 5 the scrubbed flue gas 36 passes an induced draught fan, which generates a sub-atmospheric pressure, by means of which the flow resistance of the furnace, the boiler and the flue gas washer is overcome.

Finally the scrubbed flue gas exits via chimney 6. The temperature of the flue gas upon exiting is approximately 60° C. Emission measuring apparatus is installed in chimney 6 for continuously measuring the fly ash, HCl, $SO_2$, $No_x$, CO and $C_xH_x$ content of the scrubbed flue gas upon exiting.

Figure 3:
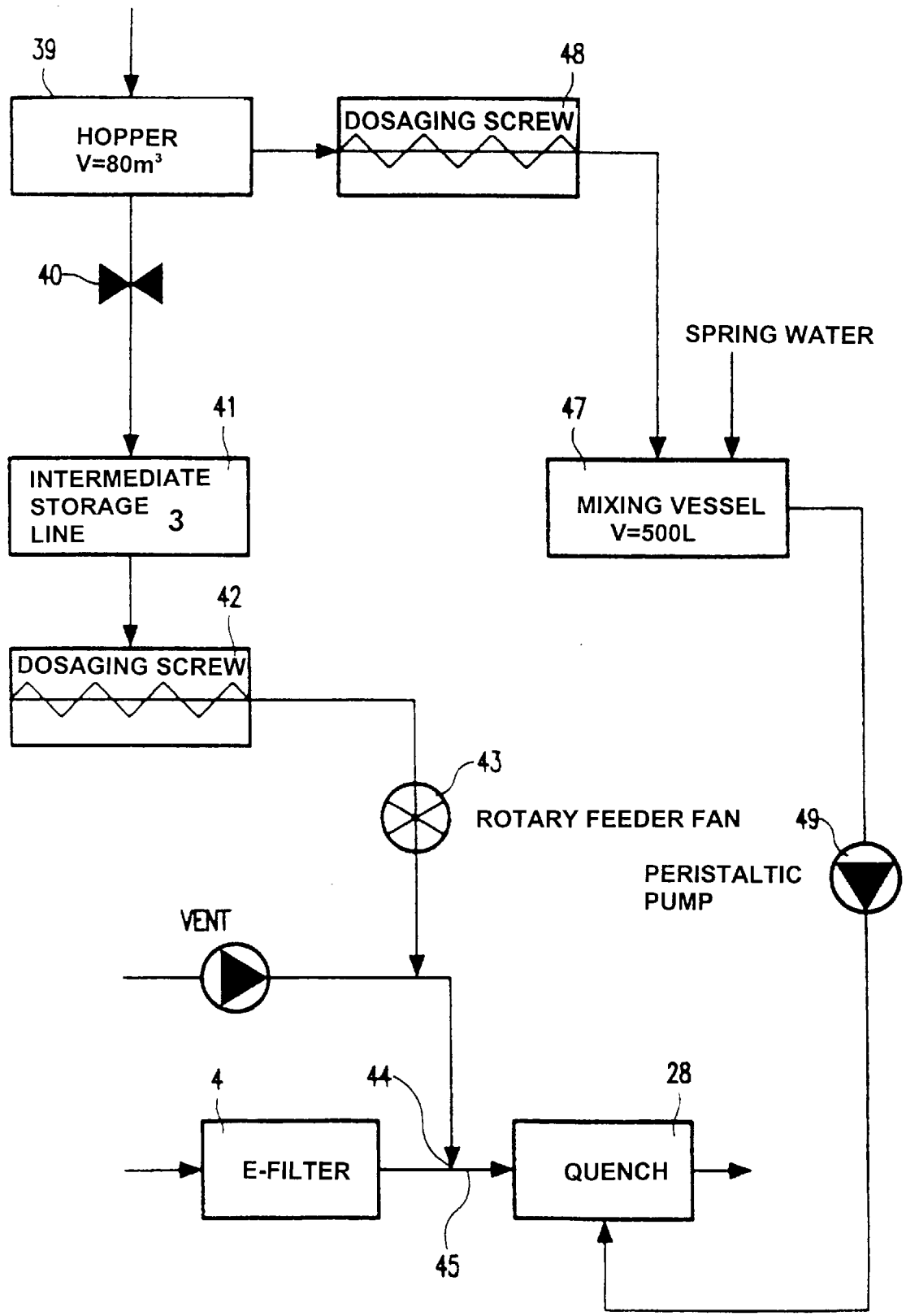
FIG. 3 diagrammatically shows an active carbon injection system according to the invention.

According to the invention an active carbon injection system is provided for removing dioxin from the flue gas, which system is diagrammatically illustrated in FIG. 3. Referring to FIG. 3, a hopper 39 having a net capacity of about 80 $m^3$ is provided for the supply of active carbon. The hopper can be filled pneumatically from a lorry. A pneumatic slide valve 40 is provided under the outlet of the storage hopper, via which an intermediate storage vessel 41 is filled. Each intermediate storage vessel is provided with a screw dosaging device 42. The dosaging takes place continuously via a rotary feeder 43. The amount of active carbon to be transported can be regulated by remote control between 1–20 kg per hour. In order to be able to determine whether the plant is functioning properly the amount of active carbon per time unit is recorded continuously.

From said rotating clearance valve 43 a measured amount of active carbon is transported through a conveyor line to an injection point 44 in the waste processing plant by means of conveying air. At the injection point 44 the active carbon is distributed into the flow of flue gas by means of four injection lances (not shown). Referring to FIG. 1, in the preferred embodiment of the invention the injection lances are positioned within the flue gas duct 45 after the electrofilter 4 and approximately 1.5 m before the first (quenching) step 28 of the flue gas washer. Based on an average velocity of the flue gas of approximately 5 m/s the average residence time of the active carbon in the flue gas flow is approximately 0.3 seconds. As a result of the turbulence of the flue gas the pulverized carbon particles are thoroughly mixed with the flue gas. Referring to FIG. 3, the required amount of conveying air is supplied by a compressed air unit (not shown) and a fan 46.

Furthermore active carbon is dosaged to the washing liquid 27 of the flue gas washer from storage hopper 29. To this end a plant is provided which is built up as follows. A mixing vessel 47 (capacity 500 l) is placed under storage hopper 39. The active carbon can be dosaged to the mixing vessel 47 by means of a worm screw 48, after which it is mixed with spring water by means of an agitator (not shown). In the preferred embodiment of the invention the mixture is introduced, by means of a peristaltic pump 49, into the washing liquid of the flue gas washer in the first washing stage 28 (quench).

Figure 4:
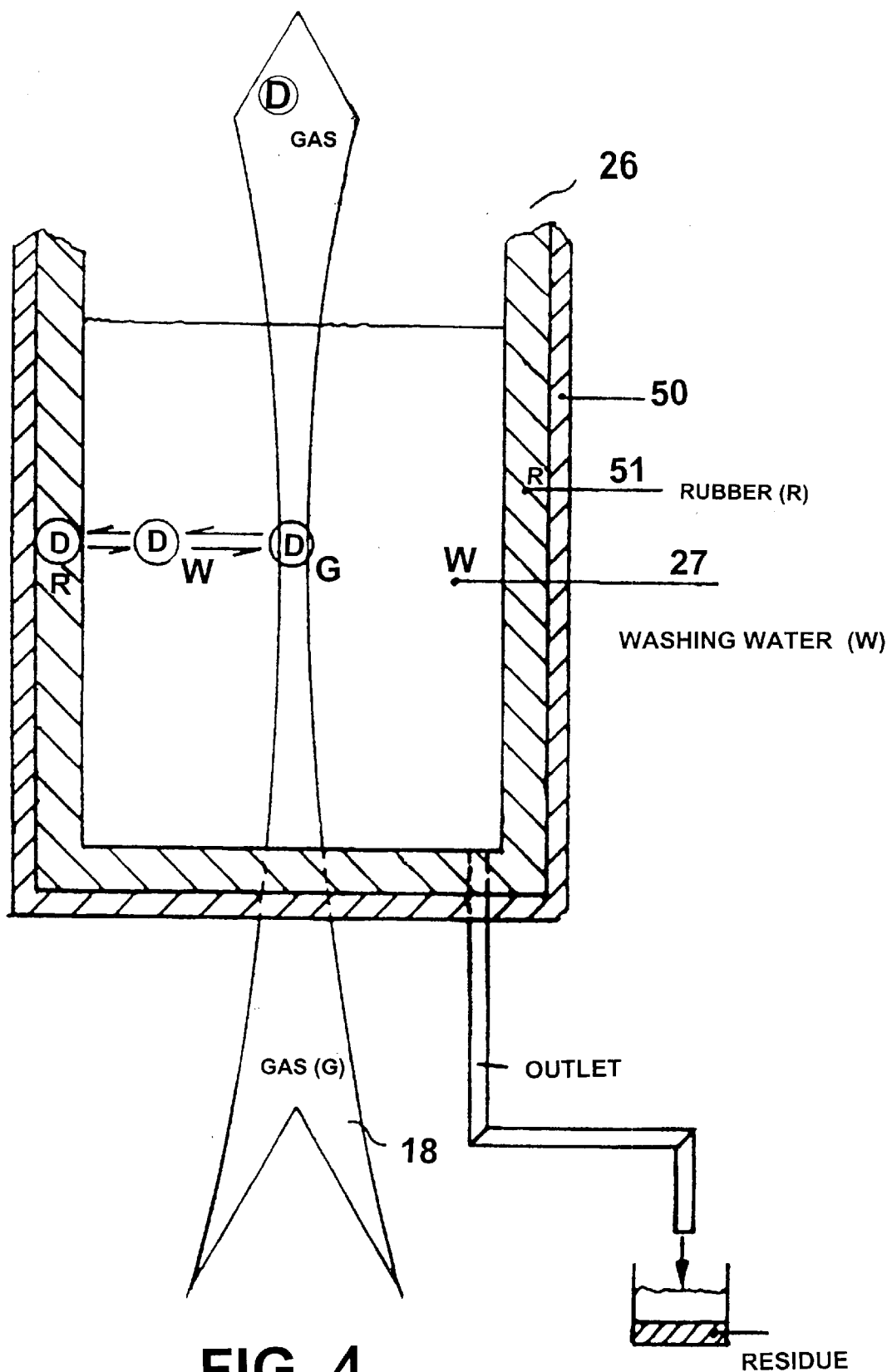
FIG. 4 is a diagrammatic cross-section of a washing device of a waste incinerator according to FIG. 1, showing the adsorption and desorption of dioxin particles.

FIG. 4 shows a schematic, highly simplified cross-section of the washing tower 26, in which the flue gas 18 is scrubbed by means of washing water 27. As already said before, washing tower 26 comprises a steel vessel 50, which is lined with rubber or plastic material on the inside 51. The washing tower and the apparatus and connecting piping, channels, tubes and the like preceding and following said washing tower are capable of adsorbing harmful substances, such as dioxin, in their respective inner linings and desorbing (release) said substances again, as shown in FIG. 4. Chemical exchange equilibriums between rubber (or plastic) lining, washing water 27 and flue gas 18 are concerned here. If the amount of dioxin contained in the flue gas 18 increases, this will result in the adsorption of dioxin by active carbon in the washing water 27 and subsequently in adsorption by the rubber (or plastic) lining 51. Said adsorption will stop once a new state of equilibrium has been found between the dioxin contents of the flue gas 18, the washing water 27 and the lining 51. The Applicant has found that this phenomenon, which those skilled in the art have not been aware of so far, occurs after a few hours already. Furthermore it applies thereby that if this high dioxin content of the flue gas is maintained for a longer period (days, weeks or months), the dioxin in question will be "stored" in the rubber (or plastic) lining 51 in cumulative amounts. Conversely it applies that if the amount of dioxin contained in the flue gas 18 decreases, desorption effects will occur—again caused by a disturbance of the equilibrium—because it is attempted to achieve a new state of equilibrium. The dioxin already stored will thereby desorb from lining 51 to (fixed parts of the apparatus present in) the washing water 27 and from there to the flue gas 18. This implies, therefore, that in this situation dioxin "from the past" will find its way to the flue gas 18, as a result of which a higher dioxin emission level will be measured in the chimney 6 of the waste incinerator of FIG. 1 if no further adjustments are made. It is possible to anticipate this situation by adjusting or controlling one or more of the process parameters that (partially) govern the dioxin content of the flue gas/washing medium. Said process parameters are preferably: amount, adsorption agent, amount of incinerated waste per time unit, temperature at the furnace of the waste incinerator and amount of air (oxygen) supplied for the incineration of waste. The latter three parameters govern the formation of dioxin in the flue gas/washing medium.

Figure 5:
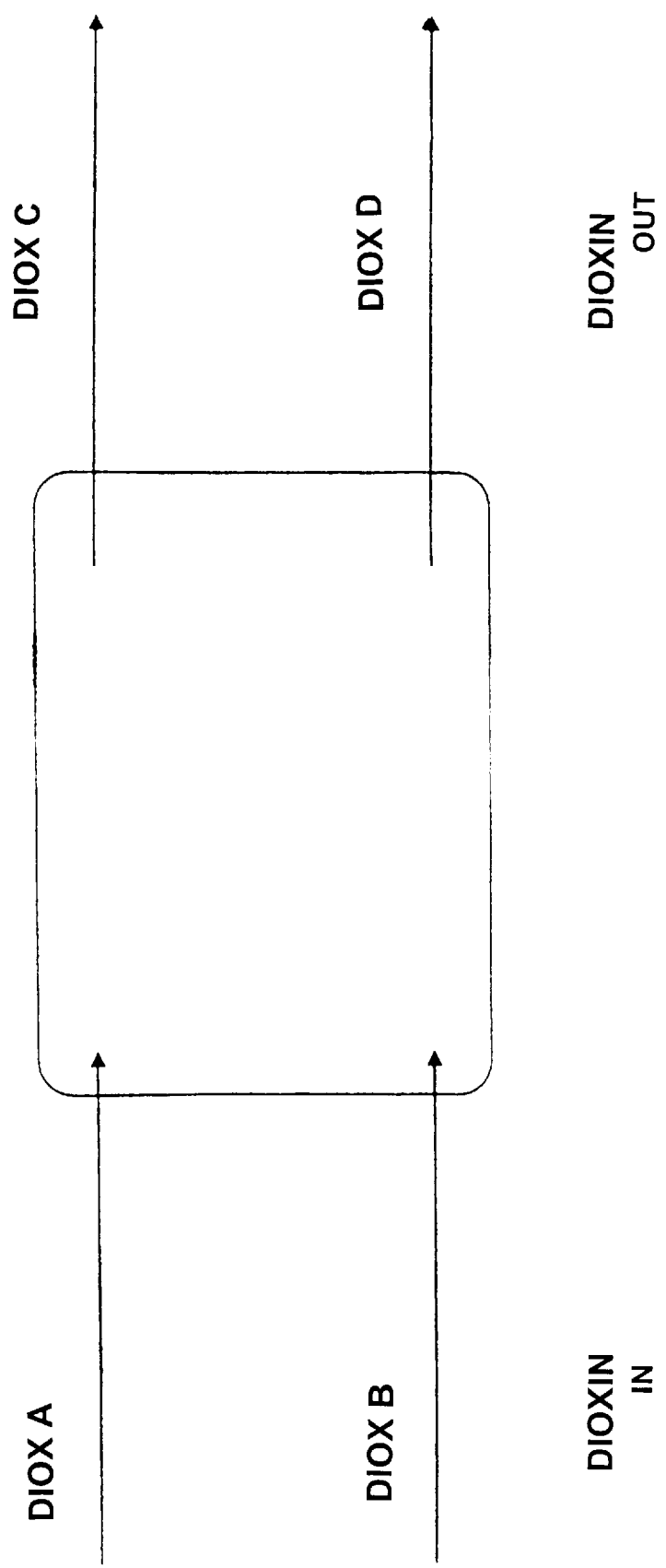
FIG. 5 is a diagram showing the dioxin equilibrium achieved with the waste incinerator of FIG. 1.

FIG. 5 is another diagrammatic illustration of the aforesaid state of equilibrium as regards the amounts of dioxin entering and exiting the plant shown in FIG. 1. The dioxin entering the plant is for the larger part dioxin present in the flue gas (A) to be scrubbed, of course, but also dioxin resulting from the aforesaid desorption via the rubber (or plastic) lining 51 of the washing tower 26(B). The discharge of dioxin takes place via the flue gas 18 in the chimney 6 of the waste processing plant (C), and also via dioxin-containing washing water. It applies thereby that A plus B equals C plus D. According to the invention the shortage or surplus B (that is, adsorption or desorption), as the case may be, can be calculated by measuring the dioxin contents of A, C and D simultaneously, thus making it possible to determine the required setting (adjustment or control) of one or more of the aforesaid process parameters. By decreasing or increasing, as the case may be, in particular the amount of carbon being injected into the plant (whilst leaving the other process parameters unchanged) it becomes possible to realise a correct, constant operation in an elegant yet inexpensive manner whilst minimizing the desorption/adsorption effects. All this makes it possible according to the invention to keep the dioxin emission from the chimney below a level of 0.1 ng TEQ/m$^3$. Also subsequent devices, which do not come into direct contact with active carbon, for example the rubber lining of chimneys, will attempt to reach a new state of equilibrium and thus start to desorb as a result of the low dioxin level of the flue gases effected by the active dosaging of carbon. Here the active dosaging of carbon indirectly contributes towards the reduction of the dioxin level eventually to be achieved, therefore. An important advantage is furthermore the fact that according to the invention dioxin stored in the lining 51 will be bound, via desorption, to active carbon present in the washing water and be discharged simultaneously therewith after having passed the subsequent physical-chemical water purification plant. Another important advantage of the invention is the fact that the active carbon makes a further contribution here by furthermore binding heavy metals, as a result of which the eventual emission of said substances in the water to be discharged after purification will be even lower. After dewatering in a filter press a filter cake remains, which contains not only dioxin but also heavy metals and the like. Complex provisions requiring intensive maintenance for discharging and processing dioxin-containing active carbon will not be needed, therefore.

In the above-described preferred embodiment of a method according to the invention the amount of active carbon is adapted to the (degree of) adsorption or desorption of dioxin by the lining 51 of the apparatus that is used. In another preferred variant the speed of the rolls 12, the amount of ambient air 15 and/or the furnace temperature are varied, that is, adapted to the (degree of) adsorption or desorption, possibly in combination with the aforesaid adaptation of the amount of active carbon. Generally it will be necessary to anticipate the (knowledge acquired from measurements of the) extent and the response time of the aforesaid adsorption or desorption in standard waste incinerators by adapting or controlling the aforesaid process parameters which play a role in the incineration of waste as regards the dioxin content, all this in order to optimize the waste incineration process in the light of a targeted dioxin emission of less than 0.1 ng TEQ/m$^3$.

I claim:

1. A process for removing harmful substances from flue gas wherein the flue gas is washed with a washing medium in an apparatus comprising a lining and the washing medium is brought into contact with an adsorption agent, the process comprising the steps of: (a) measuring the harmful substance content of the flue gas before and after the removal of the harmful substance therefrom; (b) measuring the harmful substance content of the washing medium being discharged; (c) calculating, based on the measurements obtained in steps (a) and (b), the harmful substance content of the washing medium resulting from the adsorption or desorption by the lining of the apparatus used in carrying out the process; and (d) adjusting the magnitude of at least one process parameter governing the harmful substance content of the flue gas/washing medium depending on the degree of said adsorption or desorption of the harmful substance by said lining.

2. A process according to claim 1, wherein the harmful substance is dioxin.

3. A process according to claim 1, wherein the harmful substance content of the flue gas is measured before and after the washing of the flue gas.

4. A process according to claim 1, wherein said parameter is selected from the group consisting essentially of the amount of adsorption agent, the amount of waste incinerated per time unit, the furnace temperature, the amount of air or oxygen supplied for the incineration of waste, and combinations thereof.

5. A process according to claim 1, wherein said adsorption agent is injected before washing of the flue gas takes place.

6. A process according to claim 5, wherein said adsorption agent is injected after a first cooling down of the flue gas to a temperature below 400° C.

7. A process according to claim 6, wherein the flue gas is first cooled down to a temperature below 300° C.

8. A process according to claim 6, wherein the flue gas is first cooled down to a temperature of 250° C. or below.

9. A process according to claim 5, wherein said flue gas is injected in powder form.

10. A process according to claim 1, wherein said adsorption agent is injected while the flue gas is being washed.

11. A process according to claim 10, wherein said adsorption agent is injected during a first washing stage in an at least substantially acidic environment.

12. A process according to claim 11, wherein said adsorption agent is injected in a third washing stage, whereby use is made of a venturi.

13. A process according to claim 11, wherein said adsorption agent is injected during a second washing stage in an environment which is at least substantially less acidic than that of the first washing stage.

14. A process according to claim 13, wherein said adsorption agent is injected in a third washing stage, whereby use is made of a venturi.

15. A process according to claim 1, wherein the adsorption agent comprises at least one substance selected from the group consisting essentially of active carbon, brown coal, coke, lime, lava rock and pumice stone.

16. A device for removing harmful substances from flue gas wherein the flue gas is washed with a washing medium and the washing medium is brought into contact with an adsorption agent, the device comprising: (a) a lining capable of adsorption or desorption of the harmful substance; (b) means for measuring the harmful substance content of the flue gas before and after the removal of the harmful substance therefrom; (c) means for measuring the harmful substance content of the washing medium being discharged, wherein based on measurements made by the measuring means of (b) and (c), the harmful substance content of the washing medium resulting from the adsorption or desorption by said lining is calculated; (d) means for adjusting at least one process parameter governing the harmful substance content of the flue gas/washing medium, depending on the degree of adsorption or desorption of the harmful substance by said lining.

17. A device according to claim 16, wherein the harmful substance comprises dioxin.

18. A device according to claim 16, wherein said process parameter is selected from the group consisting essentially of the amount of adsorption agent, the amount of waste incinerated per time unit, the furnace temperature, the amount of air or oxygen supplied for the incineration of waste, and combinations thereof.

19. A device according to claim 16, wherein the adsorption agent comprises at least one substance selected from the group consisting essentially of active carbon, brown coal, coke, lime, lava rock and pumice stone.

* * * * *